Sept. 6, 1960 G. R. DEMPSTER ET AL 2,951,600
COMPACTION BODIES
Filed April 16, 1958 6 Sheets-Sheet 1
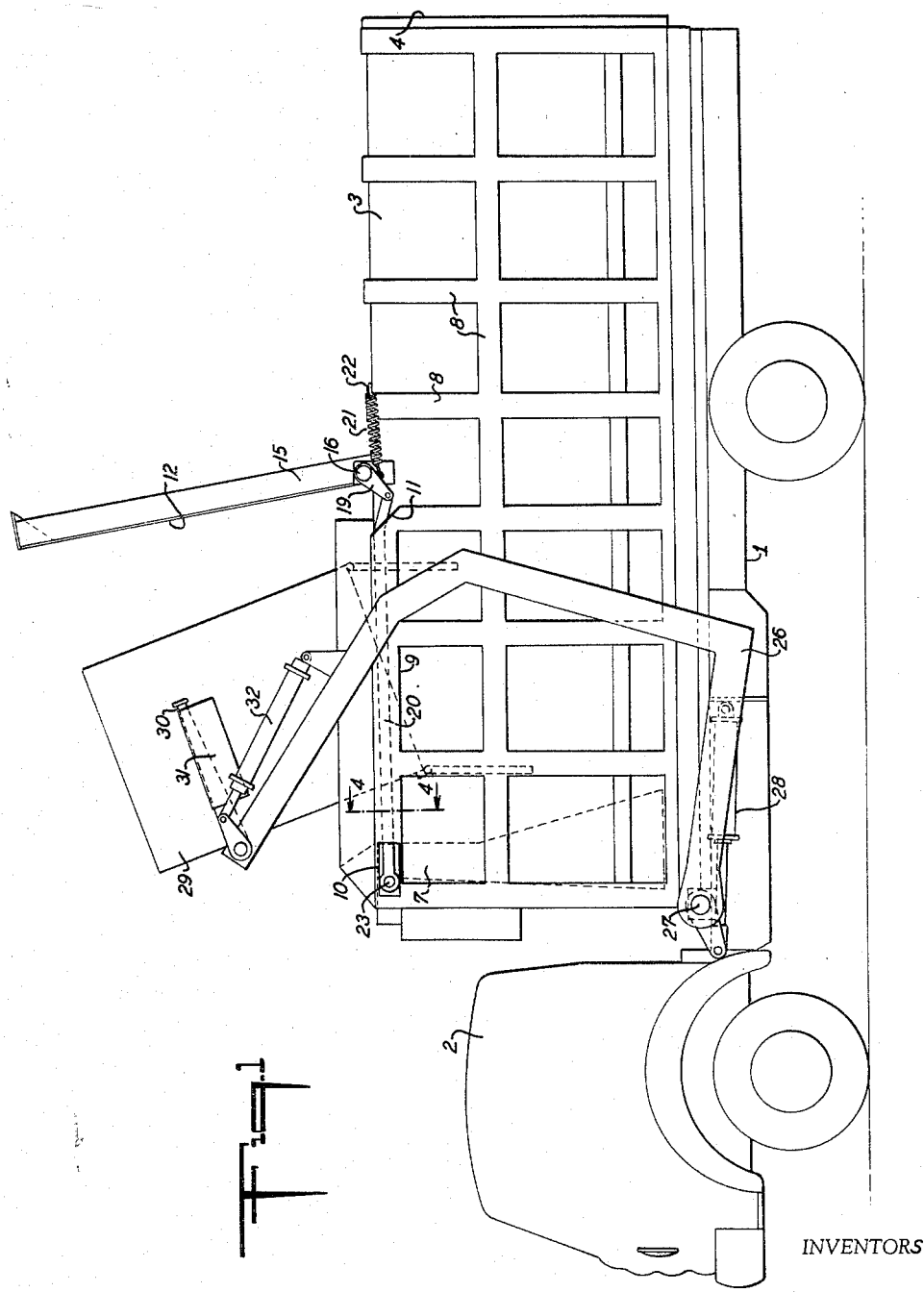
INVENTORS
GEORGE R. DEMPSTER
WILLIAM A. HERPICH
BY Shumacker & Mathis
ATTORNEYS Sept. 6, 1960 G. R. DEMPSTER ET AL 2,951,600
COMPACTION BODIES
Filed April 16, 1958 6 Sheets-Sheet 2
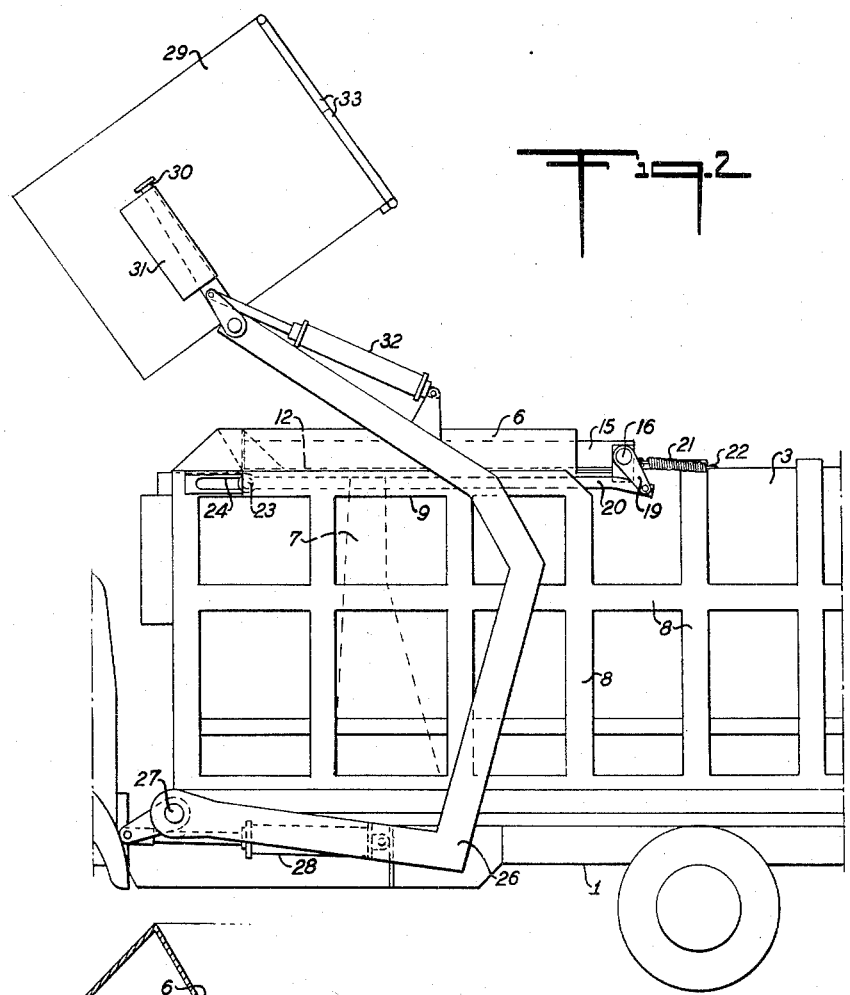
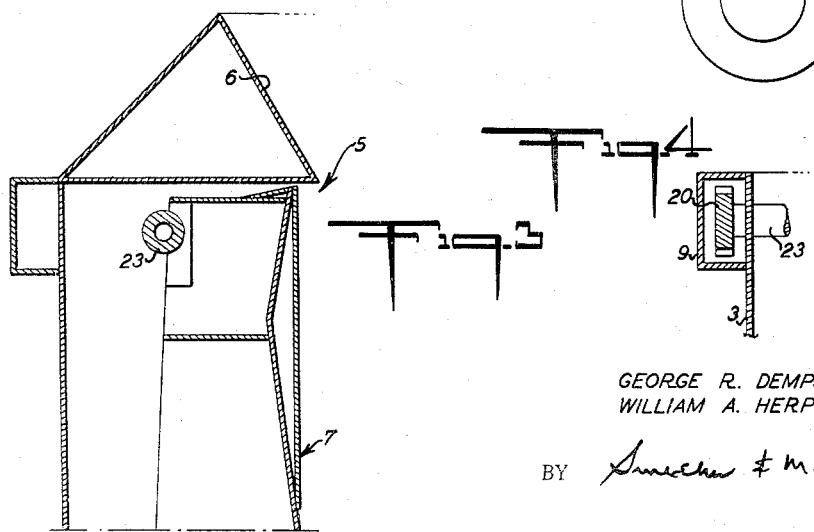
INVENTORS
GEORGE R. DEMPSTER
WILLIAM A. HERPICH
BY *Smecher & Mathis*
ATTORNEYS Sept. 6, 1960 G. R. DEMPSTER ET AL 2,951,600
COMPACTION BODIES
Filed April 16, 1958 6 Sheets-Sheet 3
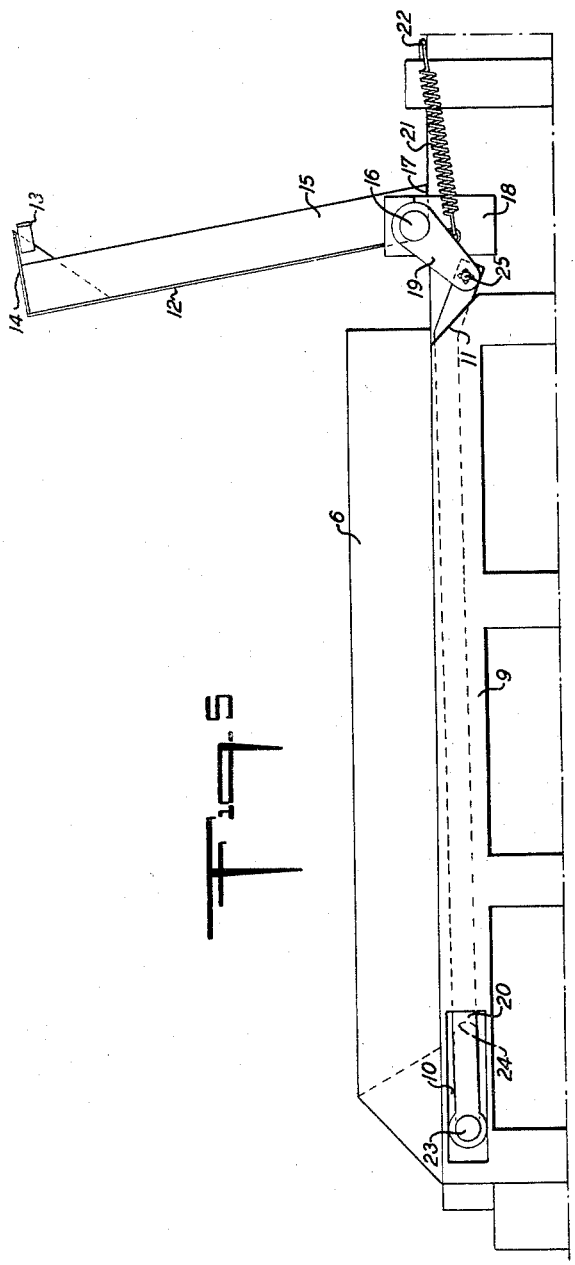
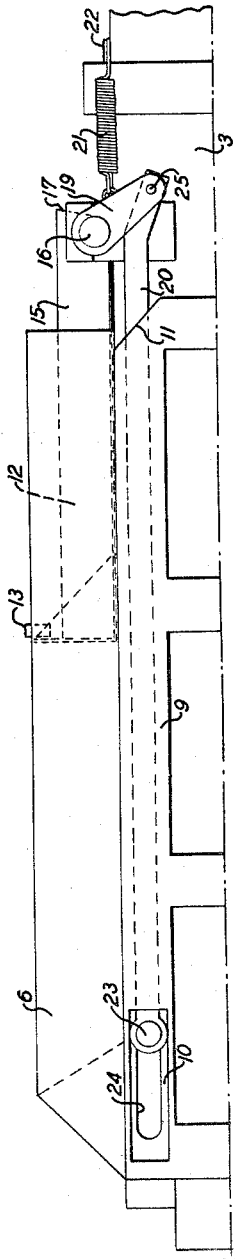
INVENTORS
GEORGE R. DEMPSTER
WILLIAM A. HERPICH
BY *Schucher & Mathis*
ATTORNEYS

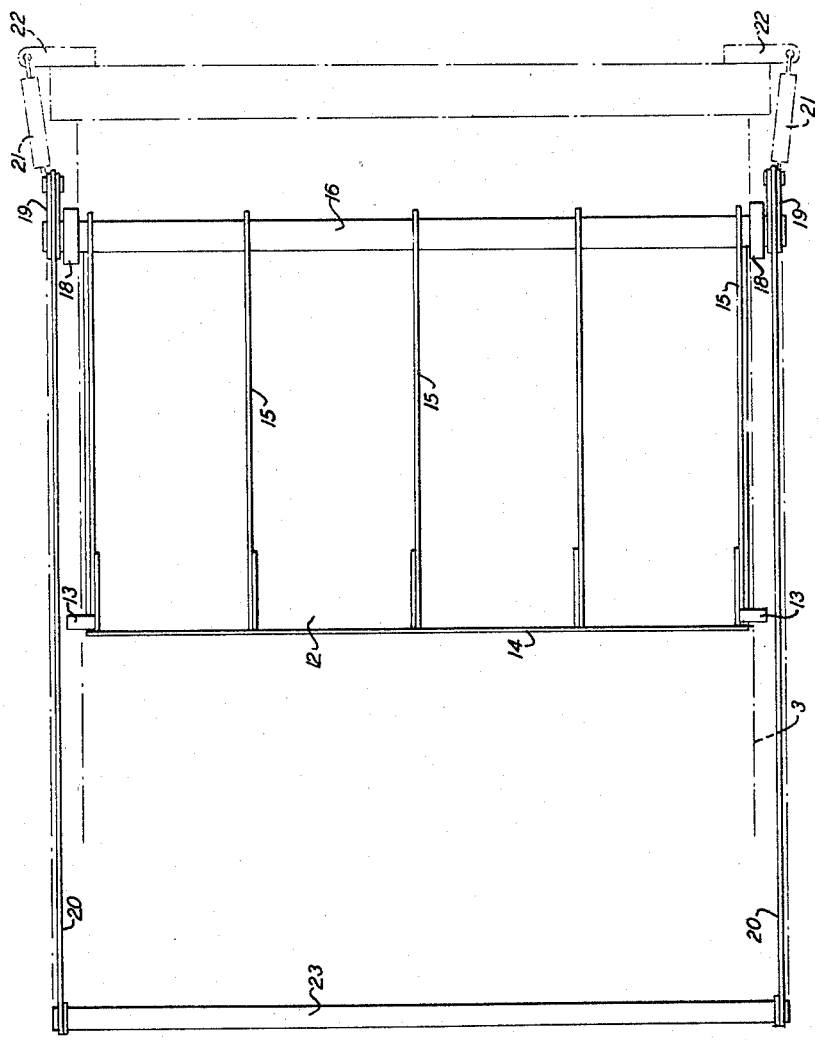

Sept. 6, 1960 G. R. DEMPSTER ET AL 2,951,600
COMPACTION BODIES
Filed April 16, 1958 6 Sheets-Sheet 5
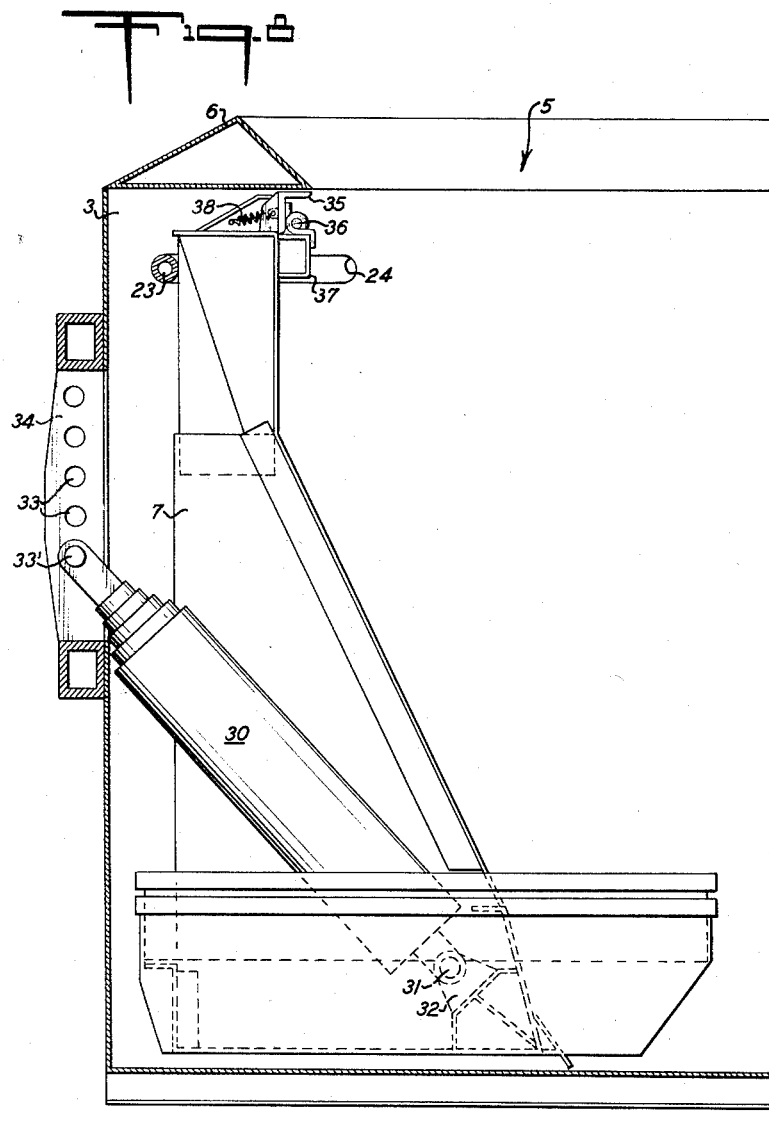
INVENTORS
GEORGE R. DEMPSTER
WILLIAM A. HERPICH
BY
ATTORNEYS Sept. 6, 1960  G. R. DEMPSTER ET AL  2,951,600
COMPACTION BODIES
Filed April 16, 1958  6 Sheets-Sheet 6
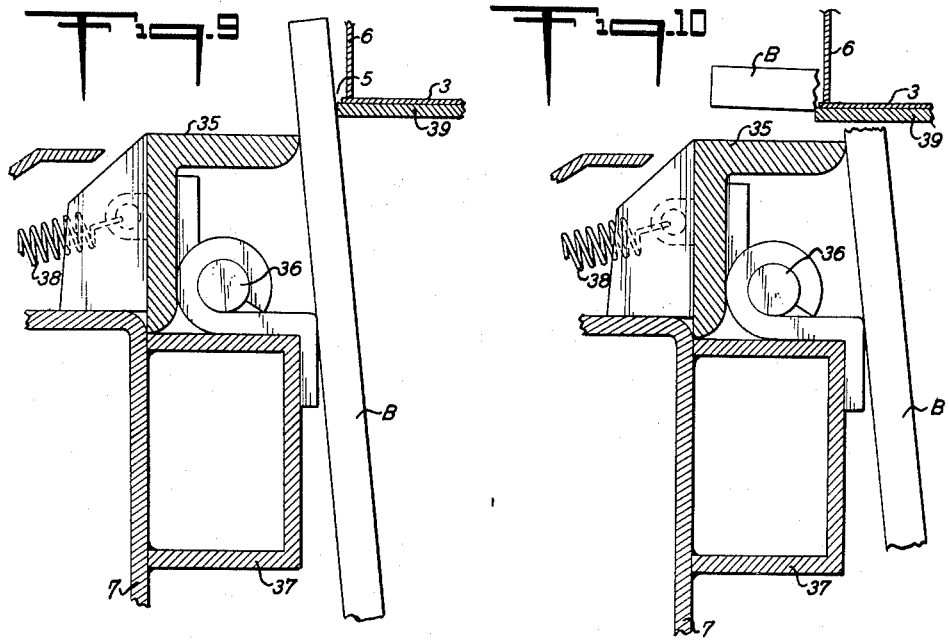
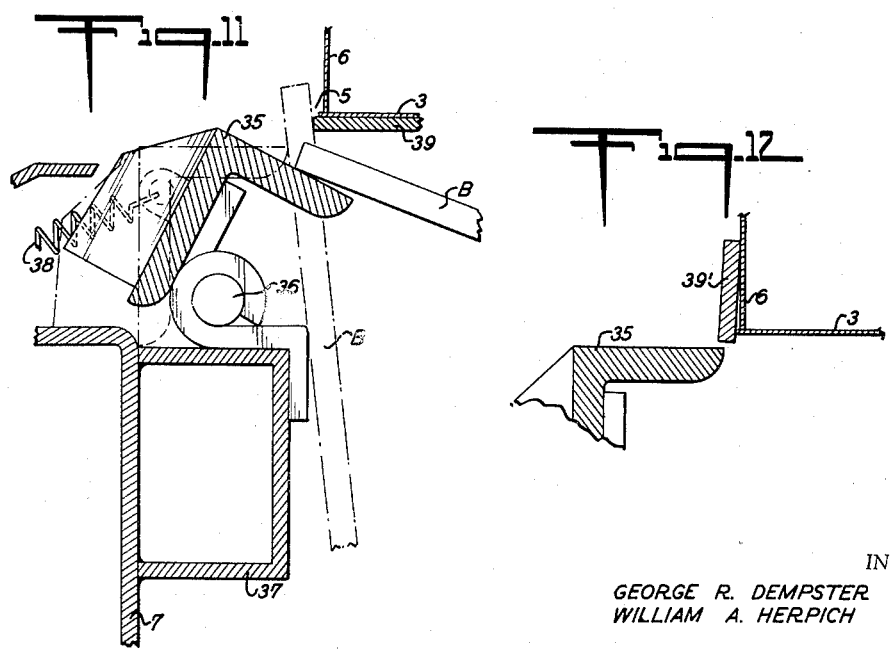
INVENTORS
GEORGE R. DEMPSTER
WILLIAM A. HERPICH
ATTORNEYS

United States Patent Office

2,951,600
Patented Sept. 6, 1960

2,951,600
COMPACTION BODIES

George R. Dempster and William A. Herpich, Knoxville, Tenn.; said Herpich assignor to Dempster Brothers, Inc., Knoxville, Tenn., a corporation of Tennessee Filed Apr. 16, 1958, Ser. No. 728,970

9 Claims. (Cl. 214—82)

This invention relates to improvements in compaction bodies, and more particularly to such vehicle bodies as are adapted for use in collecting refuse, such as garbage, trash, etc., and transporting the same to a point of dumping.

It has been the practice heretofore to provide a compaction type body with a hopper or opening thereon through which refuse is loaded into the body and within which body a packer head is mounted for movement longitudinally to different positions. Frequently, the loading hopper or opening remains uncovered during transportation of the body, both in collecting refuse and in conveying it to a point of dumping. This is objectionable because it permits light-weight material to be blown out of the body and be strewn along the streets. Moreover, it makes it difficult for the refuse to be dumped into the body, some of it falling out around the sides thereof.

One object of this invention is to improve the construction of the compaction body, to overcome the foregoing objections thereto and to provide a closure or cover for the opening which will not only confine the refuse in the body during collection and transportation, but will also insure of tamping the refuse down through the opening as it is loaded in the body.

Another object of the invention is to provide a closure for the body opening that will close automatically, except only during the filling operation, to prevent the accidental blowing of the refuse out of the body at all times, either during collection or transportation.

Still another object of the invention is to provide for use of the closure or cover not only to confine the refuse in the body, but also as a tamper to force the material into the body prior to the compacting action of the head therein.

These objects may be accomplished, according to one embodiment of the invention, by providing a cover or closure over the filling opening in the body, so as substantially to close the latter when the device is being used for collection and transportation of the refuse. The cover or closure is also preferably of such construction that it may pass through the opening to be used as a tamper in forcing the refuse down through the opening in advance of the packer head.

Provision is made, preferably, for maintaining the cover or closure in closed relation over the filling opening at all times, except only during the filling operation. Means for closing the cover may be connected therewith, such, for example, as by one or more coiled springs which normally are under tension when the cover is open and tend to return it automatically to a closed position. The opening of the cover may be synchronized with the movement of the head in the body, so as to close the cover automatically whenever the head is out of its position where it would receive the refuse, such, for example, as in its forwardmost position. Link connections may be used for this purpose which extend from a drag tube or bar in the path of the packer head to arms connected with the pivot mounting of the door, so as to utilize the force of the packer head in its forwardmost position acting through the drag tube and arms to open the door while the door is closed by gravity or by the action of the springs whenever the packer head is moved out of operative engagement with the drag tube. Thus, the closure would be maintained in closed relation to the hopper opening, except only when the packer head is in its operative position where refuse is charged into the body, and in such position, the packer head holds the door open to permit dumping of the refuse into the body.

This embodiment of the invention is illustrated in the accompanying drawings, in which:

Fig. 1 is a side elevation of a compaction body to which the invention is applied, and with the closure in open position for dumping of the refuse into the body;

Fig. 2 is a similar view, with parts broken away and showing the closure in its closed position over the opening when the container is out of its dumping position;

Fig. 3 is a detail longitudinal section through a portion of the packer head and hopper;

Fig. 4 is a detail cross section on the line 4—4 in Fig. 1;

Fig. 5 is a side elevation of the hopper portion of the body, showing the door in open position;

Fig. 6 is a similar view, showing the door in closed position;

Fig. 7 is a top plan view of the closure and its operative parts;

Fig. 8 is a longitudinal section through a portion of the compaction body, showing the packer head in elevation;

Fig. 9 is a detail cross section therethrough, showing the deflection member and shear bar in one position;

Fig. 10 is a similar view, showing another position thereof;

Fig. 11 is a similar view, showing the deflecting action of these members; and

Fig. 12 is a detail cross section, showing an alternate position of the shear bar.

The invention is shown in Figs. 1 and 2 as applied to a motor vehicle of the character that includes a vehicle chassis, generally indicated at 1, power operated and self-propelled and including a cab structure 2 enclosing the motor and driver compartment.

Mounted on the chassis 1 is a compaction body, generally indicated at 3, and which is shown as an elongated enclosed structure having doors or other suitable means, generally indicated at 4, at the rear end thereof for discharge of the refuse therefrom. A filling opening is provided at 5 (Fig. 3) in the top of the body 3 near the front, and which may be surrounded by a hopper 6 to facilitate dumping of the refuse into the body.

Operatively mounted in the body 3 is a packer head, generally indicated at 7, and which is power operated lengthwise of the body between the dotted line position, shown in Fig. 1 at the extreme forward end thereof, and a compacting position which will be intermediate the length of the body or at the rear thereof, according to the quantity of refuse collected in the body. Any suitable form of packer head and mechanism for operating the same may be used as desired, but the packer head should be moved rectilinearly of the body in guided relation therewith, for best results.

The body 3 is provided with reinforcing means, generally indicated at 8, extending lengthwise and transversely thereof. Such reinforcing means is preferably in the form of channels inverted with respect to the side plates of the body and may be welded thereto for secure bracing of the walls to hold the refuse therein. A portion of the reinforcing means extends lengthwise on opposite sides of the filling opening 5, which reinforcing channel members are indicated at 9, and have open forward and rear ends, as indicated at 10 and 11. These open ends may be formed by slots or other suitable means, as hereinafter described.

A cover or closure is indicated at 12 of a size and area substantially to fill the area of the filling opening 5, as shown in Figs. 1 and 2, or to extend partially over the opening, as shown in Figs. 5, 6 and 7. The size of the cover 12 relative to the opening may be varied, as desired, and this closure may extend either directly along the top surface of the body 3, as shown in Figs. 2 and 6, or may be so made as to be projected into the body through the opening 5 for tamping the refuse therein, according to the relative size of the opening and closure and the construction of the operating means therefor. When it is desired to limit the closing movement of the cover 12 flush with the top of the body 3, stop clips may be fixed to the cover on opposite sides, as indicated at 13 in Figs. 5, 6 and 7, to engage over the sides of the hopper 6 and thereby limit the lowering movement of the cover. These clips 13 may be welded or otherwise securely fastened to reinforcing angles connected with the end plate 14 on the free edge of the cover.

The cover or closure 12 is provided with longitudinal ribs or arms 15 which extend to and are fixed securely on a hinge pin 16 that extends transversely over the body 3. The ends of the ribs or arms 15 are sheared off at an angle of 10° to a plane extending normal to the length of the arms, as indicated at 17, which angular ends will thus engage the top surface of the body 3 in the open position of the cover and limit such open position to approximately 10° away from a vertical plane through the axis of the hinge pin 16, thereby maintaining the lid in its open position, so as to permit its closure automatically by gravity when the opening action is released. This open position is illustrated in Figs. 1 and 5.

The hinge pin 16 is mounted in a pair of bearing blocks 18, secured upon opposite sides of the body 3. These bearing blocks may be welded or otherwise secured to the body and may be split so as to facilitate mounting of the hinge pin therein. Any suitable form or character of mounting may be used as desired. The hinge pin 16 extends through the bearings 18 and has projected opposite ends in positions to receive thereon lever arms 19 that are fixed to the hinge pin 16 to turn therewith.

A pair of lever arms 19 is mounted on each projecting outer end of the hinge pin 16, spaced from each other in position to receive therebetween one end of a pull bar 20. The lever arms 19 are also connected with one end of a counterbalance spring 21, the opposite end of which is connected with a mounting plate 22 on the adjacent side of the body 3.

Each pull bar 20 extends lengthwise through the channel reinforcing member 9 substantially to the forward edge of the filling opening 5. A drag member is indicated at 23, which may be in the form of a rod or tube, and extends transversely of the body 3, with its opposite ends projecting through slots 24 in the opposite sides of the body 3. These projecting opposite ends of the drag member 23 have pivot connections with the forward ends of the pull bars 20. The rear ends of the pull bars 20 are likewise pivoted at 25 to the lever arms 19.

The drag member 23 extends transversely in the path of the packer head 7 so as to be engaged thereby when the packer head is moved to its forward position, shown in dotted lines in Fig. 1. The packer head thus acts through the drag members 23 to open the cover or closure 12 against the tension of the springs 21, and as soon as the packer head moves out of its forward position, the closure or cover 12 is closed automatically. The drag member 23 is not connected with the packer head 7, whereby the packer head is free to move rearwardly out of bearing engagement with the drag member, in its packing stroke. The rearward movement of the drag member 23 is limited by the slots 24.

The invention is shown in connection with front end loader mechanism of the character described more fully in our prior application Serial No. 662,252, filed May 28, 1957, now Patent No. 2,900,096, granted August 18, 1959.

Such loader mechanism comprises a pair of lifting arms, generally indicated at 26, pivotally mounted at 27 on opposite sides of the chassis 1. Hydraulic power devices 28 operate the arms to raised and lowered positions, some of which are illustrated in Figs. 1 and 2, but the arms can be moved to a position adjacent the ground for picking up a refuse container, as shown generally at 29.

The free end of each arm 26 carries a fork member 30 for detachably extending through a lifting channel 31 on the adjacent end of the container 29 and which fork member 30 may be moved relative to the lifting arm 26 by hydraulic power device 32, as described more in detail in the aforesaid applications. Covers are shown at 33 on the container 29, one or more of which covers may be used, as desired, for each container, or the covers may be omitted.

The closure or cover lid 12 is normally in closed position, as shown in Fig. 2, during movement of the vehicle and until the mechanism is ready to dump the contents of the container into the body. In such position, the packer head 7 is somewhat rearward of its forwardmost position. For example, the packer member may remain in an intermediate position, as indicated in Fig. 2, to which it has been moved in compressing the material in the body.

When it is desired to dump the contents of the container 29 into the body, the packer head 7 is moved to its full forward position, as shown in Fig. 1. During such movement, the packer head 7 engages the drag member 23 and acts through the latter and the pull bars 20 to move the lever arms 19 and hinge pin 16, whereby to open the closure lid 12 to its open position, shown in Figs. 1 and 5. This open position is limited by the sheared ends 17, so that the lid is always slightly forward of a fully vertical position, whereby it will close automatically by gravity as soon as the pressure of the packer head 7 is removed from the drag member 23.

Upon movement of the closure lid 12 to the open position mentioned, the lifting arms 26 can be manipulated by the hydraulic power devices 28, so as to move the container 29 to a dumping position over the hopper 6 to discharge the contents through the opening 5 therein. The hopper lid assembly serves as a back-up wall to guard against spillage of the refuse while the container is being dumped. Furthermore, the closing of this lid 12 serves to compress any piled up material in the hopper through the opening 5 into the body and hold it therein during operation of the packer head 7.

During this closing movement of the lid 12 under its own weight, the lever arms 19 will move the pull bars 20 rearward in the channel sleeves 9, thereby dragging the member 23 into the path of the packer head 7 ready for operation thereby when the packer head may be moved forward again. The tension springs 21 offer an auxiliary force in closing the lid as well as tensioning the opening movements thereof.

The packer head 7 is shown more in detail in Fig. 8, mounted for sliding movement lengthwise of the body 3 in any suitable or desired manner. A set of hydraulic cylinders 30 of the telescoping type is connected at one end at 31 with a mounting lug 32 on the base of the packer head 7 and extends upwardly therefrom to a pivotal connection 33' with the front wall portion of the body 3. A set of openings 33 in a bracket structure 34 is provided for selective connection with the upper end of the telescoping cylinder 30, one of the connections 33 being used, according to the desired angle and length of stroke of the cylinder 30.

Also shown in Fig. 8 is a deflection angle blade 35 pivotally supported at 36 on a hinge support 37, at the upper end of the packer head 7. The blade 35 projects forwardly of the hinge 36 in a position to pass under the top wall of the packer body 3, clearing the latter in the manner generally indicated in Figs. 9 and 10. The blade 35 is constructed on one edge of an angle member, normally held in position, shown in Figs. 8 to 10, by a coiled spring 38.

The rear edge of the hopper opening 5 is provided with a shear bar 39 for cooperation with the blade 35. The shear bar 39, like the blade 35, should extend substantially throughout the width of the hopper opening 5. The bar 39 is shown in Figs. 9 to 11 as mounted on the bottom face of the top wall of the body 3, although it may be mounted in the hopper opening in the position shown at 39' in Fig. 12, if preferred. The action of this shear bar will be substantially the same in either location.

The material discharged into the compaction body may include long pieces of wood, wallboard and other materials that are not readily crushed. Such pieces may be so large or long as to project up above the top edge of the packer body, as indicated at B in Fig. 9. If no means were provided for shearing such material, it may become wedged between the top face of the packer head and the inside top wall of the body, thereby preventing movement of the packer head lengthwise of the body.

With this construction, such wedging action is obviated by cutting or breaking the materials between the edges of the blade 35 and shear bar 39 in the manner indicated in Figs. 9 and 10. In the event of such severing of the materials, no wedging action can result.

In the event that the materials cannot be cut between the blade and shear bar and if such material should still wedge therebetween during the rearward travel of the packer head, these may be freed readily upon reversing the direction of the packer head and moving it forward in the body. Such reversing action and forward travel of the packer head 7 will cause the blade 35 to rotate around the hinge 36 sufficiently for the obstruction B to fall free in the manner indicated in dotted lines and in full lines in Fig. 11. After the wedging material has been removed thereby, the tension springs 38 will pull the deflection angle member into upright position, as shown in Figs. 9 and 10. Then, upon again reversing the direction of travel of the packer head 7 and moving it rearwardly, the compacting action can be completed.

While the invention has been illustrated and described in certain embodiments, it is recognized that variations and changes may be made therein without departing from the invention as set forth in the claims.

We claim:

1. In a compaction body having a filling opening and packer head within the body for movement relative to the filling opening, the combination of a cover mounted on the body for movement to open and closed positions relative to the filling opening, and operating means for the cover in the path of movement of the packer head for actuation thereby to move the cover to an open position relative to the opening, said operating means including link members operatively mounted on the sides of the body, means connecting the respective link members with the cover, and means connected with the link members and in the path of movement of the packer head in the body for moving the link members upon engagement of said means by the packer head.

2. In a compaction body having a filling opening and packer means within the body for movement relative to the filling opening, the combination of a cover, a hinge member mounting the cover for opening and closing movements relative to the opening, lever arms connected with the hinge member, a drag member extending transversely in the body in the path of movement of the packer means, and links connecting the drag member with the lever arms for actuating the cover in response to movement of the packer means.

3. In a compaction body having a filling opening and packer means within the body for movement relative to the filling opening, the combination of a cover, a hinge member mounting the cover for opening and closing movements relative to the opening, lever arms connected with the hinge member, a drag member extending transversely in the body in the path of movement of the packer means, and links connecting the drag member with the lever arms for actuating the cover in response to movement of the packer means, said body having slots in opposite sides thereof with the drag member extending through the slots, said links and lever members being externally of the sides of the body.

4. In a compaction body having a filling opening and packer means within the body for movement relative to the filling opening, the combination of a cover, a hinge member mounting the cover for opening and closing movements relative to the opening, lever arms connected with the hinge member, a drag member extending transversely in the body in the path of movement of the packer means, and links connecting the drag member with the lever arms for actuating the cover in response to movement of the packer means, said body having channel guide members on opposite sides of the filling opening extending lengthwise of the body and enclosing the link means.

5. In a compaction body having a filling opening, the combination of a packer head operatively mounted in the body for movement relative to the filling opening, a blade member pivotally mounted on the packer head in position to swing relative to the packer head upon reverse movement of the latter to liberate material clamped between said blade member and the edge of the filling opening.

6. In a compaction body having a filling opening, the combination of a packer head operatively mounted on the body for movement relative to the filling opening, a blade member pivotally mounted on the packer head in position to swing relative to the packer head upon reverse movement of the latter to liberate material clamped between said blade member and the edge of the filling opening, yieldable means for returning the blade member to normal position, and a shear bar carried by the body at an edge of the filling opening for cooperating action with said blade to shear material therebetween.

7. In a compaction body having a filling opening, the combination of a packer head operatively mounted on the body for movement relative to the filling opening, a blade member pivotally mounted on the packer head in position to swing relative to the packer head upon reverse movement of the latter to liberate material clamped between said blade member and the edge of the filling opening, and yieldable means for returning the blade member to normal position.

8. In a compaction body having a filling opening, the combination of a packer head operatively mounted in the body for movement relative to the filling opening, a blade member mounted on the packer head in a position to move relative to the filling opening, and a shear bar carried by the body at an edge of the filling opening in position for cooperating action with said blade member to shear material therebetween upon reciprocating movement of the packer head.

9. In a compaction body having a filling opening, the combination of a packer head operatively mounted in the body for movement relative to the filling opening, a blade member pivotally mounted on the packer head in a position to move relative to the filling opening, and a shear bar carried by the body at an edge of the filling opening in position for cooperating action with said blade member to shear material therebetween upon reciprocating movement of the packer head.

References Cited in the file of this patent

UNITED STATES PATENTS 2,622,748   Feidert _____ Dec. 23, 1952